United States Patent [19]
Lowrance

[11] 3,740,705
[45] June 19, 1973

[54] SUBMERGED OBJECT WARNING APPARATUS FOR SHIPS

[75] Inventor: Darrell J. Lowrance, Tulsa, Okla.

[73] Assignee: Lowrance Electronics Manufacturing Corporation, Tulsa, Okla.

[22] Filed: Jan. 17, 1972

[21] Appl. No.: 218,146

[52] U.S. Cl.............. 340/3 R, 340/3 D, 340/29, 343/7 ED, 343/112 CA
[51] Int. Cl............................................. G01s 9/68
[58] Field of Search.................. 340/1 R, 3 R, 3 D, 340/29; 343/7 ED, 7 PF, 112 CA

[56] References Cited
UNITED STATES PATENTS

| | | | |
|---|---|---|---|
| 2,974,304 | 3/1961 | Nordlund............................ | 340/3 D |
| 3,152,326 | 10/1964 | Merlo................................ | 343/7 ED |

*Primary Examiner*—Richard A. Farley
*Attorney*—Head & Johnson

[57] ABSTRACT

A submerged object warning apparatus for ships having a transmitter for transmitting short bursts of sonic energy at equal time spaced intervals, a receiver for detecting reflections of transmitted sonic energy, a time switch circuit connected to the receiver providing an output signal when reflected sonic energy is received within a preselected time, a frequency comparison circuit connected to the transmitter and receiver providing a signal output when a reflected signal is received of a frequency different from the transmitter frequency, a gate circuit connected to the timed circuit output and the frequency comparison circuit output providing an output signal when a reflected signal is received within the preselected time from an object having relative motion to the transmitter, and a warning device connected to and actuated by the gate circuit output.

5 Claims, 1 Drawing Figure

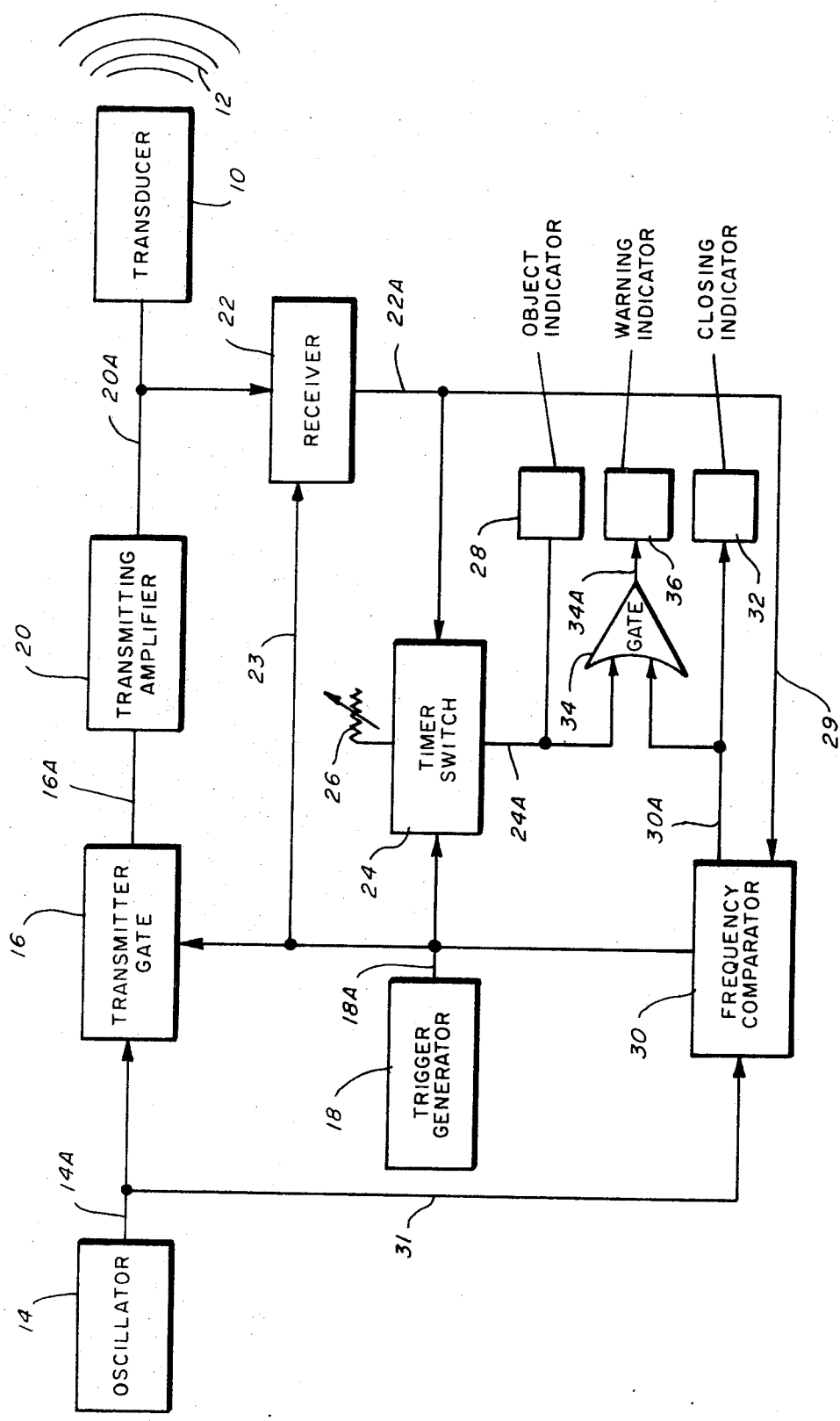

3,740,705

SUBMERGED OBJECT WARNING APPARATUS FOR SHIPS

BACKGROUND, SUMMARY AND OBJECTS OF THE INVENTION

This invention is directed towards an apparatus to enable a ship operator to avoid collision with submerged objects. Water navigation is becoming more difficult because of the increase in number of ships in use. In addition, the expanded river and canal waterways in the world have increased the need for improved means of providing a warning to a ship's pilot of submerged objects.

Submerged objects can be in the form of rocks, sand bars, bridge abutments and supports, submarines, icebergs, other ships and boats, and so forth. While radar and sonar are frequently used to provide navigation means to boat pilots, the present invention is different in that it provides a warning signal when an underwater object is detected within a preselected distance from the ship and moving relative to the ship.

It is therefore an object of this invention to provide an apparatus for use as a navigational aid on a ship to indicate the presence of a submerged object within a preselected distance and moving relative to the ship.

This basic object, as well as others, will be fulfilled in the following description and claims, taken in conjunction with the attached drawings.

DESCRIPTION OF THE DRAWINGS

The drawing is a block diagram of a circuit arrangement for practicing the invention.

DETAILED DESCRIPTION

Referring to the drawing, a basic outline of one circuit arrangement for practicing the invention is shown. A transducer 10 is positioned beneath the surface of the water and preferably to the bow of the ship utilizing the invention to project sonic energy transmission forwardly of the ship. Sonic energy propagates from transducer 10 and, upon striking an object, a portion is reflected back as an echo signal. Reflected energy is detected by transducer 10 to provide receiving signal in a manner to be described subsequently. While a single transducer 10 is shown for both transmitting sonic energy and receiving echo reflections, it can be seen that if desired the transmitting transducer and receiving transducer may be separate.

An oscillator 14 provides a constant frequency output signal at output 14A of a frequency matching the characteristics of transducer 10. The output 14A of the oscillator is fed to a transmitter gate circuit 16. A trigger generator 18 has an output 18A connected to transmitter gate 16 and, upon receipt of a trigger pulse, gate 16 is turned on and the oscillator frequency 14 is connected by transmitter gate output 16A to a transmitter amplifier 10. The output 20A of the transmitting amplifier is fed to transducer 10.

The trigger generator 18 provides equally timed spaced pulses so that a continuous sequence of short bursts of sonic energy are transmitted in the water by transducer 10. Echos from these bursts of sonic energy are received by transducer 10 and applied to a receiver 22. The output of trigger generator 18 is applied by conductor 23 to receiver 22 to block the receiver during each transmitting period. The output 22A of the receiver is fed into a timer switch 24 which is also connected to a trigger amplifier 18. Upon receipt of a trigger pulse from trigger generator 18 the timer switch 24 is turned on. If, during the on time, an echo is received by transducer 10, amplified by receiver 22 and applied to the receiver output 22A, such signal is applied to the output 24A of the timer switch. If, however, the reflection signal is received after the preset length of time established by timer switch 24, it is blocked, and does not appear at output 24A. In effect, this means that a signal at output 24A occurs only when an echo is reflected from a submerged object within a given length of time and correspondingly, within a given distance, from transducer 10. The length of time, and therefore the distance from the transducer within which received signals are permitted to pass through the timer switch 24 is controlled by a limit set 26.

The output 24A of the timer switch is applied to an object indicator 28 so that any time an echo signal is received by transducer 10 within the time preset by limit set 26 indication is given at 28. The object indicator 28 may be in the form of a light, bell, buzzer, meter, or any kind of visual or audible indicator, or any combination visual and audible indicator.

Receiver output 24A is also applied by conductor 29 to a frequency comparator 30. In addition, the signal from oscillator output 14A is connected by conductor 31 to frequency comparator 30. The output 30A of the frequency comparator is a signal which exists only when sonic energy is received by transducer 10 at a frequency different from the transmitted frequency. In other words, the output 30A of the frequency comparator 30 is a signal indicating that the reflecting object is moving relative to transducer 10. The relative movement may be caused by the objects moving towards transducer 10, or transducer 10 (the ship to which the apparatus is attached) moving towards the submerged object, or a combination of both the transducer 10 and the echo reflecting object moving towards each other. The output 30A of frequency comparator 32 is applied to a closing indicator 32. As with object indicator 28, the closing indicator 32 may be any type of visual or audio signaling device or a combination signaling device, to provide an indication when an echo producing object moving relative to the ship is detected.

It should be noted that the signal applied to frequency comparator 30 from receiver 22 is not related to timer switch 24 and thus a signal will appear at frequency comparator output 30A any time a reflected signal is received by an object moving relative to transducer 10. Thus a warning signal may be given by closing indicator 32 even though the reflecting object is not sufficiently close to provide a warning signal by object indicator 28.

The output from timer switch 24 is applied to a gate circuit 34 and, in like manner, the output of frequency comparator 30 is applied to the gate circuit. The gate circuit 34 is a logic circuit, commonly referred to as an "and" gate, which provides an output signal at 34A when a signal appears both at 24A and 30A. The output 34A is connected to a warning indicator 36. Indicator 36 may be an audible or a visual indicator, or a combination of the two.

Warning indicator 36 is activated on the occurrence of two conditions, that is, a signal at 30A indicating a reflection from an object moving relative to the transducer 10 and, a signal at 24A, indicating that the reflecting object is within a preselected distance. This activates warning indicator 36 indicating to the ship's pilot that a submerged object is within a preselected distance of the ship and is moving relative to it.

While frequency comparator 30 cannot differentiate between an object moving away from versus one moving towards transducer 10, as a practical matter the warning indicator 36, in substantially all cases, is actuated only when the transducer 10 and the submerged object are moving towards each other. If the reflecting object is moving away from transducer 10 it will soon be beyond the preselected range and therefore the warning indicator 36 would soon be deenergized It can be seen that the essence of the invention is the provision of means for activating warning indicator 36. Object indicator 28 and closing indicator 32 are ancillary indicating means. A ship's pilot may, for instance, have his attention called to the fact that a submerged object is being approached when the closing indicator 32 is actuated. This information within itself would not be cause for alarm until the submerged object which is moving closer is within the preselected distance, at which time both indicators 28 and 36 would be energized. In like manner, the ship's pilot may be warned when an object is detected within the preselected distance by the actuation of object indicator 28, but would not be unduly concerned unless the object within such preselected distance is moving towards the ship, at which time closing indicator 32 and warning indicator 36 would be activated.

It can be seen that if desired distance indicating means may be easily incorporated with the equipment. Such has not been shown since it is standard sonar technology to indicate distance to a submerged object by the use of transmission and reception of sonar waves.

While the invention has been described as it is applied for use on a ship it is intended that "ship" includes boats, barges, submarines or any type of craft moving on or beneath the surface of water. The circuit arrangement is exemplary of means of practicing the invention although it can be seen that the circuit can be changed within keeping with the spirit of this disclosure. It is understood that the invention is not limited to the specific embodiment set forth herein for purposes of exemplification, but is to be limited only by the scope of the attached claim or claims, including the full range of equivalency to which each element or step thereof is entitled.

What is claimed:

1. A submerged object warning apparatus for ships, comprising in combination:
   transmitting means for transmitting short bursts of sonic energy at equal time spaced intervals;
   receiving means for detecting reflections of transmitted sonic energy;
   timer switch circuit means connected to said receiving means providing an output signal when reflected sonic energy is received within a preselected time indicating a reflection producing object within a preselected distance;
   a frequency comparison means connected to said transmitting means and said receiving means providing a signal output when a reflected signal is received at a frequency different from the transmitted frequency indicating reflections from an object having motion relative to said transmitting means;
   a gate circuit connected to receive said timer switch circuit means output and said frequency comparison means output providing an output signal when a reflection signal is received within said preselected time from an object moving relative to said transmitting means; and
   a warning device connected to and actuated by said gate circuit output.

2. A submerged object warning apparatus for ships according to claim 1 including a near object indicator connected to and actuated by said timer switch circuit means output indicating a reflection producing object within said preselected distance.

3. A submerged object warning apparatus for ships according to claim 1 including a closing indicator connected to and actuated by said frequency comparison means output indicating a reflection producing object moving relative to said transmitting means.

4. A submerged object warning apparatus for ships according to claim 1 including:
   a near object indicator connected to and actuated by said timer switch circuit means output indicating a reflection producing object within said preselected distance; and
   a closing indicator connected to and actuated by said frequency comparison means output indicating a reflection producing object moving relative to said transmitting means.

5. A submerged object warning apparatus for ships according to claim 1 wherein said transmitting means includes:
   an oscillator having an output providing a continuous output at a selected frequency for transmitting sonic energy in water;
   a trigger generator providing spaced trigger pulses;
   a transmitter gate connected to said oscillator output and said trigger generator providing an output pulse;
   a transmitting amplifier having an input connected to receive said transmitter gate output pulse providing an amplified transmission pulse output; and
   a transducer connected to said transmitting amplifier pulse output for converting electrical transmission energy into sonic energy.

* * * * *